(12) United States Patent
Sitaram et al.

(10) Patent No.: US 9,629,136 B1
(45) Date of Patent: Apr. 18, 2017

(54) METHOD AND SYSTEM FOR REDUCING PRACH INTERFERENCE

(71) Applicant: Sprint Spectrum L.P., Overland Park, KS (US)

(72) Inventors: Krishna Sitaram, Chantilly, VA (US); Chunmei Liu, Great Falls, VA (US); Hemanth B. Pawar, Brambleton, VA (US); Pratik Kothari, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 55 days.

(21) Appl. No.: 14/719,602

(22) Filed: May 22, 2015

(51) Int. Cl.
*H04W 4/00* (2009.01)
*H04W 72/04* (2009.01)
*H04W 74/08* (2009.01)
*H04L 27/26* (2006.01)
*H04L 5/14* (2006.01)
*H04B 15/00* (2006.01)
*H04W 92/08* (2009.01)
*H04W 88/08* (2009.01)

(52) U.S. Cl.
CPC ........ *H04W 72/0413* (2013.01); *H04B 15/00* (2013.01); *H04L 5/14* (2013.01); *H04L 27/2637* (2013.01); *H04W 72/0453* (2013.01); *H04W 74/0833* (2013.01); *H04W 88/08* (2013.01); *H04W 92/08* (2013.01)

(58) Field of Classification Search
CPC . H04W 52/146; H04W 52/346; H04W 72/04; H04W 72/0426; H04W 72/1268; H04W 74/004; H04W 74/1268; H04L 5/0007; H04L 5/0092; H04L 5/0094
See application file for complete search history.

(56) References Cited

U.S. PATENT DOCUMENTS

| | | | |
|---|---|---|---|
| 2007/0141995 A1 | 6/2007 | Youn et al. | |
| 2008/0253319 A1 | 10/2008 | Ji et al. | |
| 2010/0232318 A1* | 9/2010 | Sarkar | H04W 28/18 370/254 |
| 2011/0111779 A1 | 5/2011 | Krishnamurthy et al. | |

(Continued)

OTHER PUBLICATIONS

3gpp (R1-123276, Panasonic, Qingdao, china, Aug. 13-17, 2012, "Scell Prach transmission").*

(Continued)

*Primary Examiner* — Maharishi Khirodhar

(57) ABSTRACT

Disclosed is method and apparatus to help reduce PRACH interference. In accordance with the disclosure, when a first base station determines that there is a threshold level of interference from a second base station, the first base station transmits to the second base station a directive that causes the second base station to reduce PUSCH transmission in PUSCH resources that are coincident in frequency with the first base station's PRACH. In a scenario where two base stations provide overlapping coverage and operate on the same frequency as each other, and where coverage of the second base station may interfere with coverage of the first base station, this process may thereby help to minimize or eliminate interference that PUSCH communication in the second base station's coverage area would have on PRACH communication in the first base station's coverage area.

19 Claims, 5 Drawing Sheets

(56) References Cited

U.S. PATENT DOCUMENTS

| | | | |
|---|---|---|---|
| 2012/0320855 A1 | 12/2012 | Tesanovic et al. | |
| 2013/0058315 A1* | 3/2013 | Feuersanger | H04W 52/281 370/336 |
| 2013/0114517 A1 | 5/2013 | Blankenship et al. | |
| 2013/0195048 A1* | 8/2013 | Ekpenyong | H04W 52/325 370/329 |
| 2013/0272229 A1* | 10/2013 | Dinan | H04W 52/18 370/329 |
| 2014/0119349 A1 | 5/2014 | Takano | |
| 2014/0211748 A1* | 7/2014 | Gunnarsson | H04W 72/02 370/329 |

OTHER PUBLICATIONS

3gpp (R1-144141, NTT DOCOMO, Ljubljana, Slovenia, Oct. 6-10, 2014, "Remaining issues on PRACH handling and its power control").*
U.S. Appl. No. 14/543,465, filed Nov. 17, 2014.
U.S. Appl. No. 14/303,097, filed Jun. 12, 2014.
U.S. Appl. No. 14/531,628, filed Nov. 3, 2014.
A. Daeinabi, et al., "An Intercell Interference Coordination Scheme in LTE Downlink Networks based on User Priority and Fuzzy Logic System," International Journal of Wireless & Mobile Networks (IJWMN) vol. 5, No. 4, Aug. 2013.

* cited by examiner

METHOD AND SYSTEM FOR REDUCING PRACH INTERFERENCE

BACKGROUND

Unless otherwise indicated herein, the description provided in this section is not itself prior art to the claims is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In accordance with the air interface protocol, each coverage area may operate on one or more carrier frequencies or "carriers." Each carrier may be frequency division duplex (FDD), in which the uplink and downlink operate on different respective ranges of frequency (frequency channels), or time division duplex (TDD), in which the uplink and downlink are multiplexed over time on a common range of frequency.

Further, each coverage area may define a number of channels or specific resources for carrying signals and information between the base station and UEs. For instance, on the uplink, certain resources may be reserved to carry access request messages from UEs seeking to gain access to the base station, other resources may be reserved to carry other uplink control signaling such as measurement reports and scheduling requests, and still other resources may be reserved to carry bearer traffic (e.g., application-layer communications) in a manner assigned or scheduled by the base station. And on the downlink, certain resources may be reserved to carry a pilot or reference signal that UEs may detect and measure to evaluate coverage quality, other resources may be reserved to carry scheduling directives, access response messages, and other downlink control signaling, and still other resources may be reserved to carry bearer traffic in a manner assigned or scheduled by the base station.

When a UE is within coverage of a base station, the UE may from time to time transmit to the base station an access request message. The purpose of such an access request message may depend on the air interface protocol and the circumstances. By way of example, a UE may transmit an access request as a request to gain initial access to communication with a base station, such as to transition from an idle state to a connected state for instance or to facilitate handover to the base station. As another example, a UE may transmit an access request as a response to a page message and/or as a request to establish a particular communication connection such as a call or data session. As still another example, a UE may transmit an access request to register or re-register with a base station and/or to provide a location or tracking area update. And as still another example, a UE may transmit an access request to provide the base station with timing advance information or the like, to facilitate positioning or other functions. Once the base station receives a UE's access request, perhaps after further processing by the base station and/or associated infrastructure, the base station may then transmit an access response message to the UE.

By way of example, the access request that a UE transmits to the base station may take the form of a signature or pattern that is randomly selected from a plurality of signatures or patterns. For instance, in an LTE system, 64 signatures, referred to as preambles, are available, and the UE may randomly select one of the preambles to transmit to the base station. Since multiple UEs may be transmitting access requests at the same time, the preamble may serve to differentiate the request transmitted by the UE from other requests originating from different UEs. Once the base station receives the preamble, the base station may transmit an access response message corresponding to the received preamble. Such a response message, for instance, may include an assignment of an initial uplink resource for the UE to use to communicate with the base station. In response to detecting the access response message corresponding to the preamble, the UE may then communicate with the base station on the assigned uplink resource to complete the communication connection.

OVERVIEW

In a wireless network where a base station's uplink air interface spans a particular frequency bandwidth (whether as an uplink channel of a FDD carrier or as the frequency range of a TDD carrier shared over time between uplink and downlink), the resources that are set aside to carry UE access requests may be a certain portion of that frequency bandwidth, defining a physical random access channel (PRACH), and the resources that are set aside to carry bearer traffic from UEs to the base station may be a separate portion of the frequency bandwidth, defining a physical uplink shared channel (PUSCH).

In an LTE system, for instance, the uplink frequency bandwidth may be divided into a plurality of 180-kHz wide physical resource blocks (PRBs), and, in certain timeslots, particular ones of those PRBs may be reserved to define the PRACH and other ones of the PRBs may be reserved to define the PUSCH. (Still other ones of the PRBs per timeslot may be reserved for other purposes as well, such as to define a physical uplink control channel (PUCCH) for instance.) In a representative LTE implementation, for example, the PRACH may be deemed to occupy a particular group of six PRBs on a recurring basis (e.g., once per frame), and the base station may broadcast a system information message to its served UEs, indicating which PRBs define the PRACH, so that the UEs can then transmit access requests to the base station when appropriate.

In a system where multiple base stations operate on the same uplink frequency as each other, the base stations may be arranged by default to define their PRACHs on the same frequency as each other, such as in the same PRBs on the same time schedule. A problem with this default arrangement, however, is that PRACH communications in one coverage area could interfere with PRACH communications in another overlapping coverage area. PRACH interference, in turn, may lead to failed access requests and consequent user experience issues.

Such an interference problem may be particularly likely to occur, for instance, in a scenario where a wireless service provider operates a macro base station on a given uplink carrier frequency and deploys multiple small cell base stations in range of the macro base station and operating on the same uplink carrier frequency. In particular, in that arrangement, PRACH communication in the macro coverage area could interfere with PRACH communication in the small cell coverage area, or vice versa. Further, depending on the placement and coverage of the small cells, PRACH communications in a given small cell coverage area could interfere with PRACH communication in another small cell coverage area.

One solution to this problem is to configure adjacent base stations to define their PRACHs at different positions in their common frequency bandwidth. For instance, through manual setup or automated interaction between the base stations, one base station could be configured to define its PRACH in a first group of PRBs in a given timeslot, and the other base station could be configured to define its PRACH in a different (mutually exclusive) group of PRBs in that timeslot. Defining the base stations' PRACHs at different positions in their common uplink frequency range would help to avoid interference between PRACH communications in their coverage areas.

Unfortunately, however, a further problem that can arise with this solution is that PUSCH communications in one base station's coverage area could interfere with PRACH communications in the other base station's coverage area. In particular, if the adjacent base stations define their PRACHs at different places in their common uplink frequency, the PRACH of one base station may then overlap in frequency with the PUSCH of other base station, and the PRACH of the other base station may overlap in frequency with the PUSCH of the first base station. Consequently, there would be a risk that PUSCH communications in one base station's coverage area would interfere with PRACH communications in the other base station's coverage area, which could similarly give rise to user experience issues. Therefore, a further solution is desired.

Disclosed herein is method and apparatus to help reduce PRACH interference. In accordance with the disclosure, when a first base station in such a scenario determines that there is a threshold level of interference from a second base station, the first base station will automatically transmit to the second base station a directive that causes the second base station to reduce PUSCH transmission in PUSCH resources that are coincident in frequency with the first base station's PRACH. Thus, in a scenario where two base stations provide overlapping coverage and operate on the same frequency as each other, and where coverage of the second base station may interfere with coverage of the first base station, this process may help to minimize or eliminate interference that PUSCH communication in the second base station's coverage area would have on PRACH communication in the first base station's coverage area.

Accordingly, in one respect, disclosed is a method operable in a wireless communication system that includes multiple base stations that each operate on at least a common frequency bandwidth (i.e. the same frequency), where each base station is configured to provide wireless service on a respective air interface defining within the frequency bandwidth a respective PRACH and a respective PUSCH. In accordance with the method, a first one of the base stations detects threshold air interface interference from a second one of the base stations. And, in response to at least detecting that threshold air interface interference from the second base station, the first base station transmits to the second base station a directive causing the second base station to reduce PUSCH transmission in PUSCH resources that are coincident in frequency with the first base station's PRACH.

Further, in another respect, disclosed is wireless communication system configured to manage air interface resources. As disclosed, the wireless communication system includes a first base station and a second base station. The first base station is configured to provide wireless service on a first air interface defining within a frequency bandwidth a first PRACH and a first PUSCH, and the second base station is configured to provide wireless service on a second air interface defining within the frequency bandwidth a second PRACH and a second PUSCH. And the second PRACH overlaps in frequency with the first PUSCH, and the first PRACH overlaps in frequency with the second PUSCH. Further, the first base station is configured to (i) detect threshold air interface interference from the second base station and (ii) responsive to at least the detecting, transmit to the second base station a directive that causes the second base station to reduce PUSCH transmission in resources of the second PUSCH that are coincident in frequency with the first PRACH.

And still further, disclosed is a non-transitory computer-readable medium having stored thereon program instructions executable by a processor to cause a first base station to carry out various operations. In accordance with the disclosure, the operations include making a determination (i) that the first base station has detected threshold air interface interference from a second base station and (ii) that a PRACH on an air interface provided by the first base station overlaps in time and frequency with a PUSCH on an air interface provided by the second base station. Further, the operations include, responsive to the determination, outputting for transmission to the second base station a directive for causing the second base station to reduce transmission in resources of the PUSCH that are coincident in time and frequency with the PRACH of the first base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
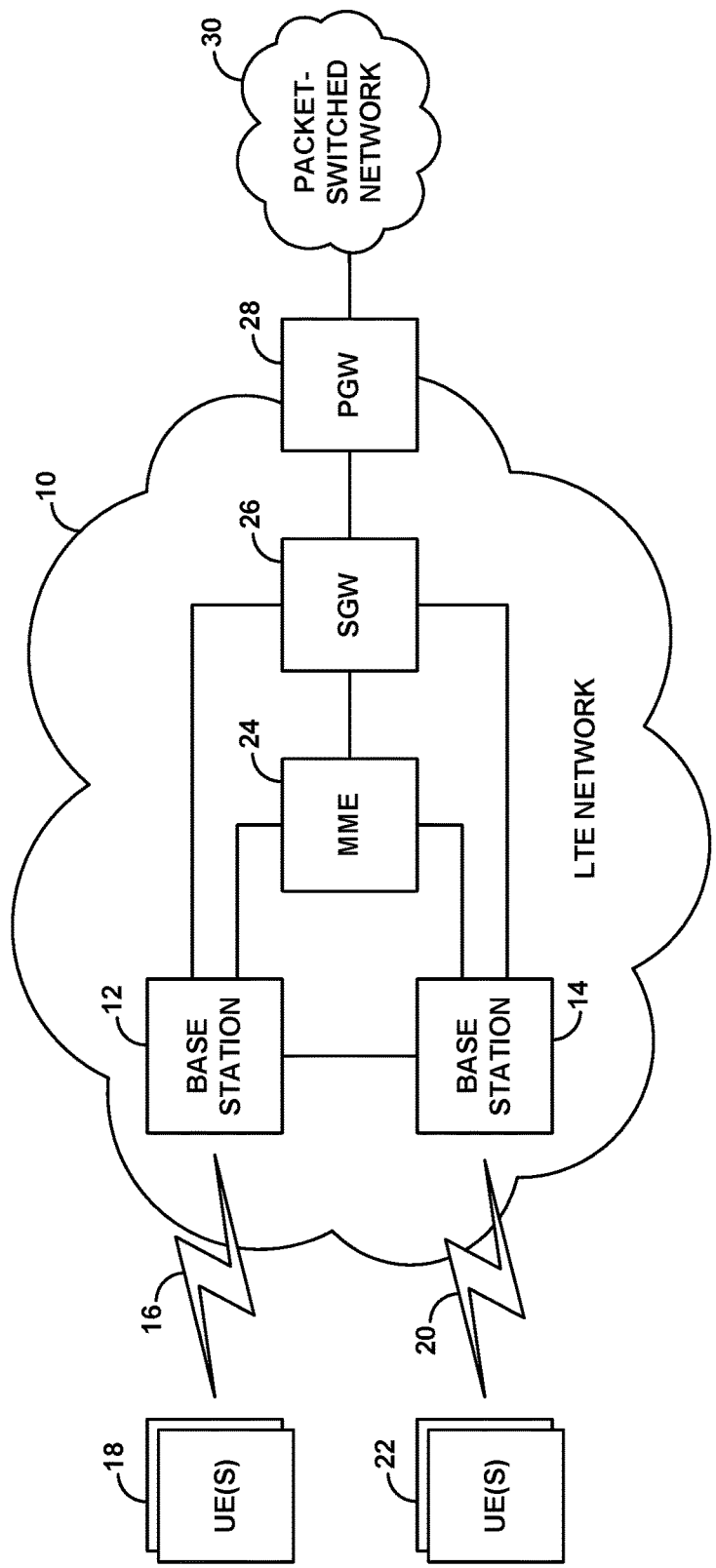
FIG. 1 is a simplified block diagram of an example wireless communication system in which the present disclosure can be implemented.

Referring to the drawings, as noted above, FIG. 1 is a simplified block diagram of an example wireless communication system in which features of the present disclosure can be implemented. In particular, FIG. 1 depicts a representative LTE network 10, which functions primarily to serve UEs with wireless packet data communication service, including possibly voice-over-packet service, but may also provide other functions. As shown, the LTE network includes two representative LTE base stations (evolved Node-Bs (eNodeBs)) 12, 14, each of which would have an antenna structure and associated equipment for providing a respective LTE air interface coverage area in which to serve UEs. By way of example, base station 12 is shown providing a coverage area 16 in which to serve one or more UEs 18, and base station 14 is shown providing a coverage area 20 in which to serve one or more UEs 22. The UEs may take various forms, such as any of those noted above, whether or not operated by a human "user."

In practice, the coverage areas 16, 20 provided by base stations 12, 14 will overlap each other in whole or in part, so that a UE served by one of the base stations may detect air interface communications from the other base station, and each base station may also be able to detect air interface communications from the other base station. Physically, the base stations themselves may co-located or distributed at some distance from each other.

Further, the base stations may each take various forms. By way of example, either or each base station could be a macro base station of the type typically provided by a wireless service provider with a tower mounted antenna structure and associated equipment. Or either or each base station could be a small cell base station typically provided to help improve coverage within macro cell coverage and usually having a much smaller form factor and coverage range than a macro base station. As a specific example, base station 12 could be a macro base station, and base station 14 could be a small cell base station positioned at least partially within coverage of the macro base station. Thus, the two base stations would provide overlapping coverage. Alternatively, both base stations could be small cell base stations or could take still other forms.

As further shown in the example arrangement of FIG. 1, the base stations have a communication interface (e.g., an LTE "X2" interface) with each other, and each base station has a communication interface with a mobility management entity (MME) 24 that functions as a signaling controller for the LTE network and may also facilitate communication between the base stations. Further, each base station then has a communication interface with a serving gateway (SGW) 26, which in turn has a communication interface with a packet-data network gateway (PGW) 28 that provides connectivity with a packet-switched network 30, and the MME 24 has a communication interface with the SGW 26. In practice, the illustrated components of the LTE network may sit as nodes on a private packet-switched network owned by an operator of the LTE network, and thus the various communication interfaces may be logical interfaces through that network.

In accordance with a version of LTE, each base station is configured to provide wireless service on one or more carriers, each of which may be either FDD or TDD. Further, the present disclosure addresses a scenario where the two base stations 12, 14 operate on at least one common uplink frequency bandwidth (i.e., that there is a particular frequency range on which both base stations provide uplink air interface service).

In LTE, uplink air interface resources are mapped in the time domain and frequency domain. In the time domain, LTE defines a continuum of 10-millisecond (ms) frames divided into 1 ms subframes (or transmission time intervals (TTIs)) and 0.5 ms timeslots. On an FDD carrier, uplink and downlink communication may occur concurrently in all of these subframes, on separate respective frequency channels. Whereas, on a TDD carrier, certain ones of the subframes per frame are used for uplink communication, and other ones of the subframes per frame are used for downlink communication.

Figure 2:
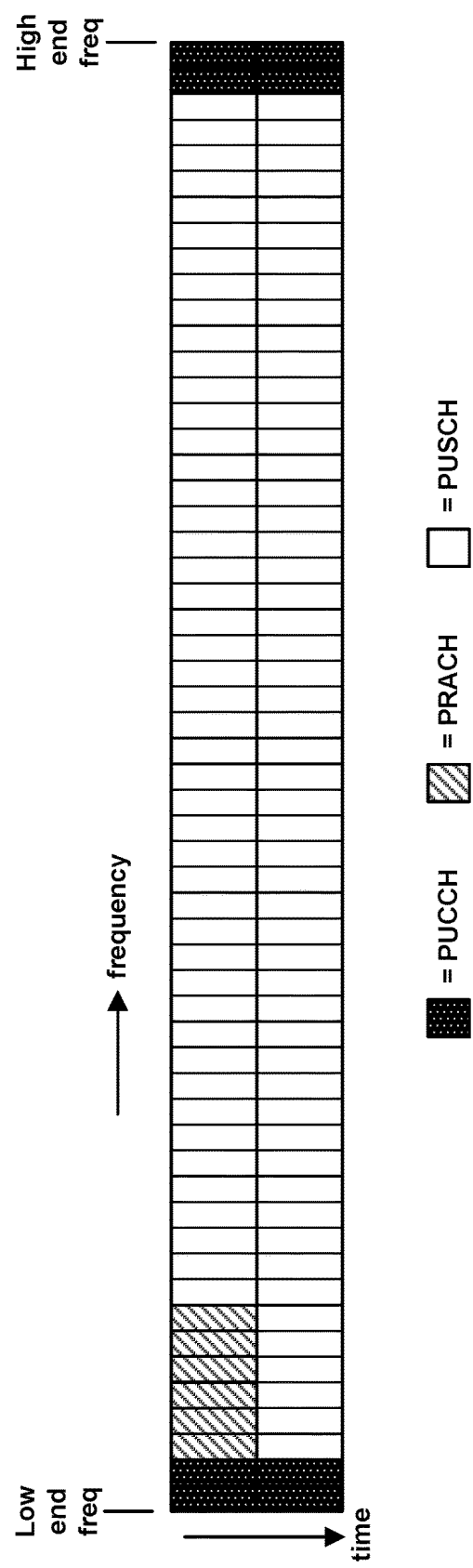
FIG. 2 is a diagram of an uplink resource grid of an example air interface.

As noted above, the uplink frequency bandwidth in each timeslot on an LTE carrier is divided into 180-kHz wide PRBs, and, on a recurring basis, a group of six (or some other number) of those PRBs may be set aside to define a PRACH and others of those PRBs may be set aside to define a PUSCH. FIG. 2 illustrates an example of this arrangement in a representative uplink subframe. As shown in FIG. 2, the uplink frequency spans a particular bandwidth, defining a specific frequency range from a lower end to an upper end in the frequency spectrum. Further, the subframe is divided over time into two 0.5-ms timeslots, and the frequency bandwidth is divided over time into 180-kHz wide segments, defining a series of PRBs per timeslot. (For simplicity, a limited number of these PRBs are shown.)

In the illustrated arrangement, a PUCCH (physical uplink control channel) is defined by default as spanning the first two PRBs in the frequency bandwidth and the last two PRBs in the frequency bandwidth. Further, a PRACH is defined as spanning the first six PRBs following the lower end PUCCH in one of the timeslots, and the PUSCH is defined as spanning the remaining PRBs in that timeslot and the remaining PRBs in the other timeslot.

As noted above, the base station providing this air interface configuration may broadcast a system information message that specifies where the PRACH is located. For instance, the base station may broadcast in a System Information Block #2 (SIB2) message a "pRACH-Frequency-Offset," which is an index of the number of PRBs where the PRACH starts following the lower-end PUCCH in a predefined or additionally-specified recurring timeslot. Thus, UEs served by the base station may receive that indication and thereby learn where the PRACH is defined and thus which resources to use for transmitting access requests when appropriate.

Further, the base station may then manage uplink communication of bearer-communication in PRBs set aside to define the PUSCH. In practice, for instance, when a UE has bearer data to transmit to the base station, the UE may transmit a scheduling request to the base station, and the base station may then assign particular PUSCH PRBs for use by the UE to transmit the data to the base station. In particular, the base station may determine, based on channel quality measures or the like, what power level and modulation and coding scheme the UE should use for this transmission, the base station may select and reserve one or more PUSCH PRBs (in a particular subframe) for the UE's transmission, and the base station may generate and transmit to the UE on a downlink control channel a scheduling directive that instructs the UE to engage in the uplink transmission (i) in the reserved PUSCH PRB(s), (ii) using the determined uplink transmission power level, and (iii) using the determined modulation and coding scheme. In response to this scheduling directive, the UE may thus accordingly engage in the uplink transmission in the designated PUSCH PRB(s).

Figure 3:
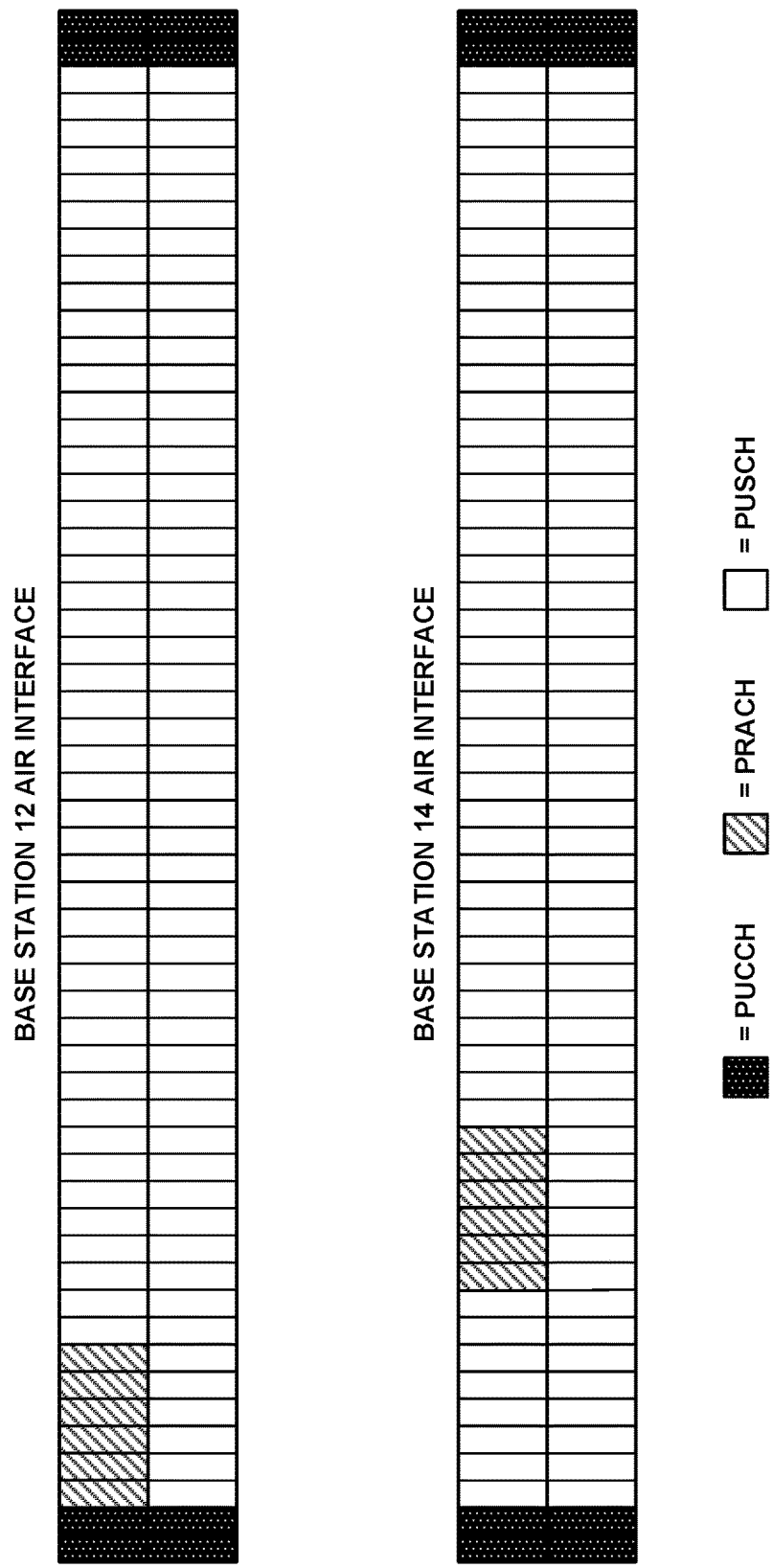
FIG. 3 is a diagram depicting uplink resource grids of two example overlapping coverage areas.

As noted above, the present disclosure can address a scenario where the two base stations at issue both provide uplink wireless service on at least a common frequency bandwidth, and where the PRACHs of the two base stations are at different positions in the frequency bandwidth to help avoid PRACH interference. FIG. 3 depicts such an arrangement, showing two concurrent subframes aligned in the frequency domain to illustrate the issue. The top illustration represents an example uplink air interface arrangement of base station 12 and is identical to that of FIG. 2 for simplicity. The bottom illustration then represents an example uplink air interface arrangement of base station 14.

As shown in FIG. 3, within a given timeslot, the PRACH of base station 12 occupies the first six PRBs following the PUCCH, and the PUSCH of base station 12 occupies the remaining PRBs between the PUCCH PRBs. Whereas, within the same timeslot, the PRACH of base station 14 occupies a different group of six PRBs, and the PUSCH of base station 14 occupies the remaining PRBs. As is evident with this arrangement, the PRACH of base station 12 coincides in frequency and time with some of the PUSCH resources of base station 14, and the PRACH of base station 14 coincides in frequency and time with some of the PUSCH resources of base station 12. As discussed above, this can create further PRACH interference problems, as PUSCH transmissions to base station 12 may interfere with PRACH transmissions to base station 14, and PUSCH transmissions to base station 14 may interfere with PRACH transmission to base station 12.

To help address this problem, in accordance with the present disclosure, a first base station that detects the existence of interference from second base station can responsively engage in signaling with the second base station to cause the second base station to reduce PUSCH communication on air interface resources coincident with the resources used by the first base station for a PRACH. The reduction of PUSCH communication on such air interface resources in the coverage area of the second base station may thereby help to reduce or minimize the extent of interference on the coincident PRACH in the coverage area of the first base station.

Figure 4:
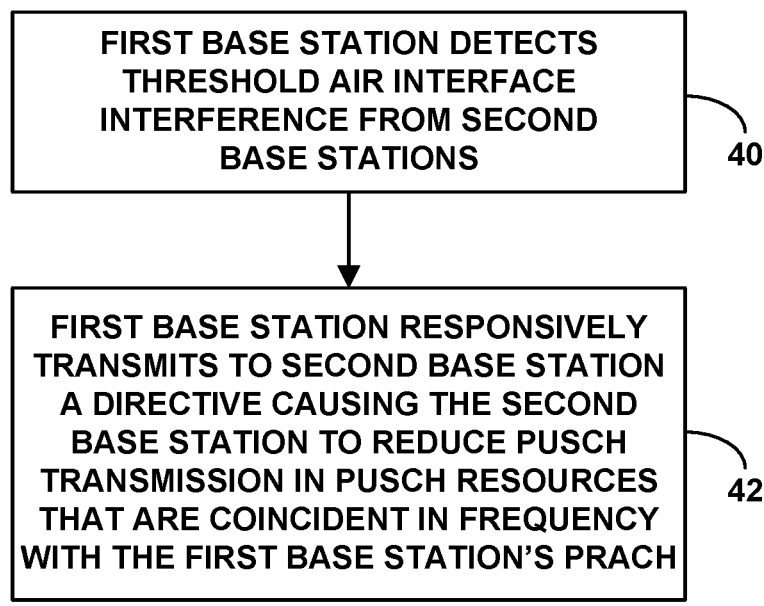
FIG. 4 is a flow chart depicting operations that can be carried out in accordance with the present disclosure.

FIG. 4 is a flow chart depicting an example of this method, operable in a wireless communication system having multiple base stations that each operate on at least a common frequency bandwidth, with each base station being configured to provide wireless service on a respective air interface that defines within the frequency bandwidth a respective PRACH and a respective PUSCH. As shown in FIG. 4, at block 40, the method involves a first of the base stations detecting threshold air interface interference from a second one of the base stations. Further, at block 42, the method then involves, responsive to at least the detecting of that threshold interference, the first base station transmitting to the second base station a directive causing the second base station to reduce PUSCH transmission in PUSCH resources that are coincident in frequency with the first base station's PRACH.

In this method, the act of the first base station detecting the threshold interference from the second base station can take various forms. By way of example, this feature can involve the first base station receiving an air interface transmission from the second base station and determining that the received transmission is threshold strong. For instance, the first base station could use its transceiver to scan for a reference signal broadcast by the second base station and could evaluate the signal strength of that received reference signal, just as a UE would do. Determining that the received reference signal is at least as strong as a defined threshold level of strength could then be deemed an example of detecting threshold interference from the second base station.

As another example, this feature could involve the first base station receiving from at least one UE served by the first base station at least one measurement report indicating that the at least one UE detected threshold strong transmission from the second base station. For instance, one or more UEs served by the first base station may provide measurement reports indicating determined reference signal strength of neighboring base stations, such as the second base station, possibly in response to detecting that that signal strength is at least as strong as a defined threshold level of strength. Such reports could indicate (e.g., as a Boolean indication) simply that the UE(s) detected such threshold signal strength from the second base station and/or such reports could further specify the detected signal strength.

Further, the act of detecting threshold interference from the second base station does not need to be keyed to a reference signal broadcast by the second base station, but could additionally or alternatively be keyed to one or more other emissions from the second base station, with respect to a given TTI for instance.

Moreover, although the detecting of interference from the second base station will lead to directing the second base station to reduce PUSCH transmission in PUSCH resources coincident with the PRACH of the first base station, the detecting may or may not be with respect to those resources particularly. It may be the case that the detecting may be with respect to the second base station generally, possibly with respect to some portion of the frequency bandwidth other than where the first base station's PRACH resides. Alternatively, the detecting could be detecting of threshold interference from the second base station specifically in the air interface resources where the first base station's PRACH resides, such as in that particular portion of the frequency bandwidth. Other variations are possible as well.

In practice, as shown by way of example in FIG. 3, the first base station's PRACH and the second base station's PRACH are concurrent in time but occupy different respective sub-carriers than each other within the frequency bandwidth. In that case, the method may additionally include the first base station determining that the first base station's PRACH overlaps in frequency with the second base station's PUSCH (e.g., in the given TTI at issue), in which case the act of transmitting the directive to the second base station may be responsive to the combination of (i) detecting the threshold interference from the second base station and (ii) determining that the first base station's PRACH overlaps in frequency with the second base station's PUSCH.

To facilitate this in practice, the first base station may maintain neighbor-data that indicates an arrangement of the second base station's air interface. Such data could be provisioned into the first base station by manual engineering input and/or through an automated process, possibly through signaling communication between the base stations. And the data may indicate, as attributes of the second base station's air interface arrangement, where and when the second base station's PRACH is positioned, and where and when the second base station's PUSCH is positioned. Given knowledge of where the first base station's PRACH is positioned, the first base station may then refer to such data as a basis to determine that the first base station's PRACH overlaps in frequency with the second base station's PUSCH.

Further, the act of the first base station responsively transmitting to the second base station the directive causing the second base station to reduce PUSCH transmission in PUSCH resources that are coincident in frequency with the first base station's PRACH could also take various forms. To begin with, the first base station could send this directive to the second base station via an X2 interface or other inter-base station communication link (via one or more intermediate entities) and could structure the directive in a manner that the second base station is configured to interpret and respond to accordingly. Or the first base station could send the directive in some other manner. In addition, the directive itself could take various forms and convey various information.

In an implementation where the first base station's PRACH recurs periodically (e.g., once a frame or at some other interval) and occupies a specific portion of the frequency bandwidth, the directive from first base station to the second base station could cause the second base station to reduce PUSCH transmission in PUSCH resources that are coincident in time and frequency with the first base station's PRACH. One way to do this is for the directive to expressly specify the timing and frequency of the PRBs at issue (i.e., to specify the resources (which are the second base station's PUSCH resources) those that coincide with the first base station's PRACH). Another way to do this is to simply direct the second base station to reduce such transmission; if the second base station maintains neighbor-data (provisioned as noted above) to indicate the timing and frequency position of the first base station's PRACH, the second base station may then respond to such a directive by reducing PUSCH transmission in the PRBs that define the first base station's PRACH.

Further, the act of the second base station reducing PUSCH transmission in PUSCH resources coincident in frequency with the first base station's PRACH (e.g., those coincident in time and frequency with the first base station's PRACH) may also take various forms, and thus the second base station may respond to the directive from the first base station in one or more of various ways. Moreover, the directive itself from the first base station could specify how the second base station is to reduce the PUSCH transmission at issue.

By way of example, reducing PUSCH transmission in such PUSCH resources (resource elements defining the PRBs at issue) may involve reducing PUSCH transmission power, which the second base station can accomplish by artificially reducing the transmission power level in its scheduling directive(s) for those PUSCH resources to be lower than what would normally be dictated based on channel quality reports and the like. As another example, reducing PUSCH transmission in such PUSCH resources may involve reducing coding rate for transmission in the PUSCH resources, which the second base station can accomplish by artificially switching the modulation and coding scheme in its scheduling directive(s) for those PUSCH resources to a lower order codec or the like than what would normally be dictated based on channel quality reports and the like. And as still another example, reducing PUSCH transmission in such PUSCH resources may involve forgoing scheduling of transmission in the PUSCH resources altogether, which the second base station can accomplish by eliminating those resources from the set of resources available to be allocated to UEs for uplink transmission, or otherwise by specifically not selecting those PUSCH resources for allocation.

Note also that, although an example implementation of the present method specifically focuses on an implementation as in FIG. 3 where relevant reduction in PUSCH transmission would be with respect to PUSCH resources coincident in both frequency and time with the PRACH of the first base station (e.g., in the very same PRBs), it may also be worthwhile to more generally reduce such transmission in PUSCH resources coincident in frequency with the PRACH of the first base station, possibly without consideration of timing. To begin with, reducing such PUSCH transmission generally in PUSCH resources coincident with the first base station's PRACH would include reducing such PUSCH transmission at the time the first base station's PRACH occurs. Further, there may be implementations where the first base station's PRACH spans time generally, in which case such general reduction of PUSCH transmission coincident in frequency with the first base station's PRACH could be beneficial.

Figure 5:
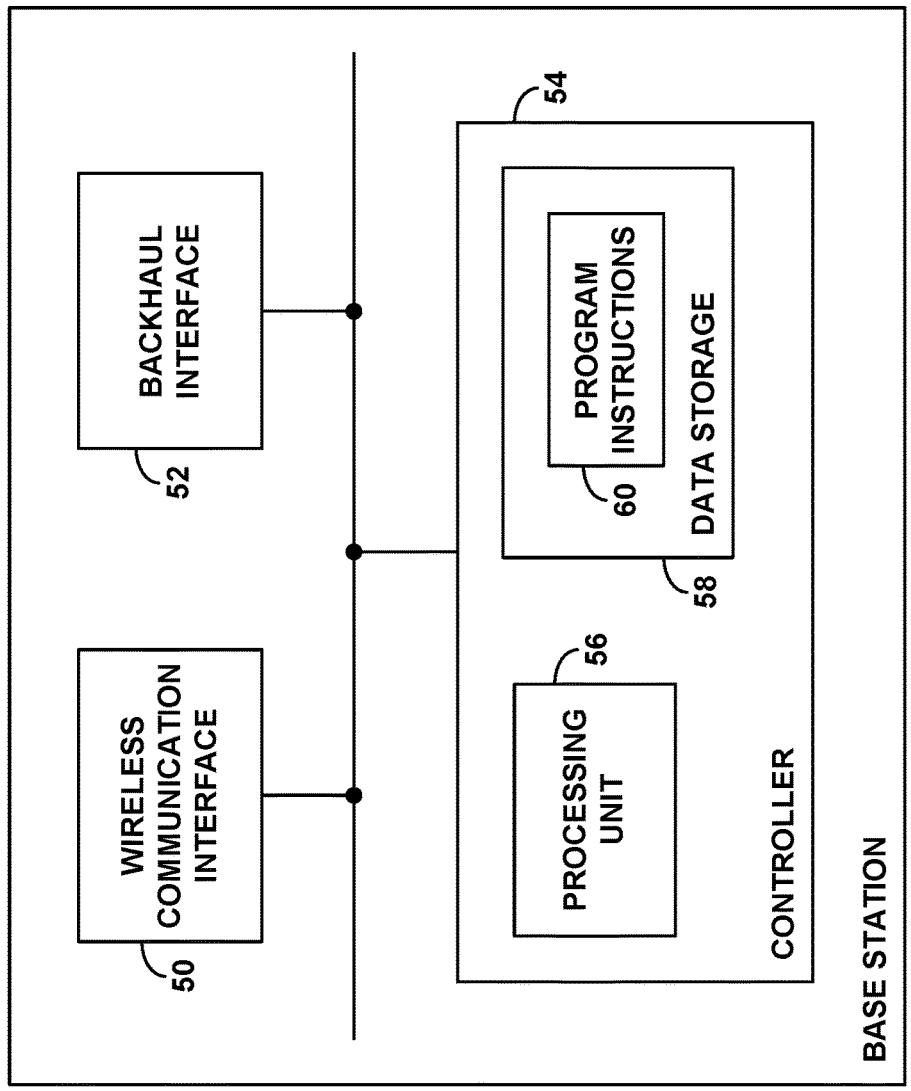
FIG. 5 is a simplified block diagram of a base station operable in accordance with the disclosure.

FIG. 5 is next a simplified block diagram of a base station operable in an example implementation. In practice, this base station could be one that functions as base station 12 or base station 14 (e.g., the first base station or the second base station) in the implementations discussed above. As such, the base station is optimally configured to provide wireless service on an air interface defining a PRACH and a PUSCH, and to carry out various base station operations as described above, such as those discussed above with respect to FIG. 4.

As shown in FIG. 5, the example base station includes a wireless communication interface 50, which may include a radio and antenna structure arranged to provide wireless service in accordance with an air interface protocol such as LTE for instance. Further, the base station includes a backhaul interface 52, such as an Ethernet interface, facilitating communication with other network entities including the other base station for example. And the base station includes a controller 54 for carrying out the various operations discussed above. As shown, for instance, the controller 54 may include a processing unit 56 (e.g., one or more microprocessors) and non-transitory data storage 58 (e.g., optical, magnetic, and/or flash storage), and the data storage 58 may hold program instructions 60 executable by the processing unit to carry out the various base station operations discussed above.

Features of the present method can also be provided more generally by a non-transitory computer readable medium (e.g., an optical, magnetic, and/or flash storage device) having stored thereon program instructions executable by a processor (e.g., a processing unit as described above) to cause a first base station to carry out various operations such as those described above. For instance, the operations may include making a determination (i) that the first base station has detected threshold air interface interference from a second base station and (ii) that a PRACH on an air interface provided by the first base station overlaps in time and frequency with a PUSCH on an air interface provided by the second base station. And the operations may further include, responsive to the determination, outputting for transmission to the second base station a directive for causing the second base station to reduce transmission in resources of the PUSCH that are coincident in time and frequency with the PRACH of the first base station.

Further, in line with the discussion above, the act of reducing transmission in the resources of the PUSCH that are coincident in time and frequency with the PRACH of the first base station may include identifying the resources that are coincident in time and frequency with the PRACH of the first base station and carrying out an operation such as (i) reducing transmission power in the identified resources, (ii) reducing coding rate for transmission in the identified resources, or (iii) forgoing scheduling of the identified resources.

Exemplary embodiments have been described above. It should be understood, however, that variations from these embodiments are possible, while remaining within the scope of the invention.

We claim:

1. A method operable in a wireless communication system including multiple base stations that each operate on at least a common frequency bandwidth, wherein each base station is configured to provide wireless service on a respective air interface defining within the frequency bandwidth a respective physical random access channel (PRACH) and a respective physical uplink shared channel (PUSCH), the method comprising:
   detecting, by a first one of the base stations, threshold air interface interference from a second one of the base stations; and
   responsive to at least the detecting, transmitting from the first base station to the second base station a directive causing the second base station to reduce PUSCH transmission in PUSCH resources that are coincident in frequency with the first base station's PRACH, wherein reducing PUSCH transmission in PUSCH resources comprises reducing coding rate for transmission in the PUSCH resources.

2. The method of claim 1, wherein detecting by the first base station the threshold air interface interference from the second base station comprises a feature selected from the group consisting of (i) receiving by the first base station a transmission from the second base station and determining that the received transmission is threshold strong and (ii) receiving by the first base station from at least one user equipment device served by the first base station at least one report indicating that the at least one UE detected threshold strong transmission from the second base station.

3. The method of claim 1, wherein first base station's PRACH and the second base station's PRACH are concurrent in time but occupy different respective sets of sub-carriers than each other within the frequency bandwidth, the method further comprising:
   determining by the first base station that the first base station's PRACH overlaps in frequency with the second base station's PUSCH,
   wherein the transmitting of the directive to the second base station is responsive to the detecting and the determining.

4. The method of claim 3, wherein the first base station maintains neighbor-data that indicates an arrangement of the second base station's air interface, and wherein determining by the first base station that first base station's PRACH overlaps in frequency with the second base station's PUSCH is based on reference to the data.

5. The method of claim 3, wherein the base stations' respective air interfaces define a continuum of transmission time intervals (TTI), and wherein the detecting and determining occur with respect to one such TTI.

6. The method of claim 1, wherein the base stations' air interfaces are orthogonal frequency division multiple access (OFDMA) air interfaces.

7. The method of claim 1, wherein the first base station's PRACH recurs periodically and occupies a specific portion of the frequency bandwidth, and wherein the directive from the first base station to the second base station causes the second base station to reduce PUSCH transmission in PUSCH resources coincident in time and frequency with the first base station's PRACH.

8. The method of claim 1, wherein the directive is specifies the PUSCH resources in which the second base station should reduce PUSCH transmission.

9. The wireless communication system of claim 1, further comprising an X2 interface communicatively linking the first base station with the second base station, wherein transmitting the directive to the second base station is via the X2 interface.

10. The method of claim 1, wherein reducing coding rate for transmission in the PUSCH resources comprises specifying in a scheduling directive for the PUSCH resources a lower order codec than what would normally be dictated by reported channel quality.

11. A wireless communication system configured to manage air interface resources, the wireless communication system comprising:
   a first base station configured to provide wireless service on a first air interface defining within a frequency bandwidth a first physical random access channel (PRACH) and a first physical uplink shared channel (PUSCH); and
   a second base station configured to provide wireless service on a second air interface defining within the frequency bandwidth a second PRACH and a second PUSCH, wherein the second PRACH overlaps in frequency with the first PUSCH and the first PRACH overlaps in frequency with the second PUSCH,
   wherein the first base station is further configured to (i) detect threshold air interface interference from the second base station and (ii) responsive to at least the detecting, transmit to the second base station a directive that causes the second base station to reduce PUSCH transmission in resources of the second PUSCH that are coincident in frequency with the first PRACH, wherein reducing PUSCH transmission in PUSCH resources comprises reducing coding rate for transmission in the PUSCH resources.

12. The wireless communication system of claim 11, wherein detecting the threshold air interface interference from the second base station comprises a feature selected from the group consisting of (i) receiving a transmission from the second base station and determining that the received transmission is threshold strong and (ii) receiving from at least one user equipment device served by the first base station at least one report indicating that the at least one UE detected threshold strong transmission from the second base station.

13. The wireless communication system of claim 11, wherein first base station's PRACH and the second base station's PRACH are concurrent in time but occupy different respective sets of sub-carriers than each other within the frequency bandwidth, wherein the first base station is further configured to determine that the first base station's PRACH overlaps in frequency with the second base station's PUSCH, wherein the transmitting of the directive to the second base station is responsive to the detecting and the determining.

14. The wireless communication system of claim 13, wherein the first air interface and second air interface are both orthogonal frequency division multiple access (OFDMA) air interfaces.

15. The wireless communication system of claim 11, wherein the first base station's PRACH recurs periodically and occupies a specific portion of the frequency bandwidth, and wherein the directive from the first base station to the second base station causes the second base station to reduce PUSCH transmission in PUSCH resources coincident in time and frequency with the first base station's PRACH.

16. The wireless communication system of claim 11, wherein reducing coding rate for transmission in the PUSCH resources comprises specifying in a scheduling directive for the PUSCH resources a lower order codec than what would normally be dictated by reported channel quality.

17. A non-transitory computer-readable medium having stored thereon program instructions executable by a processor to cause a first base station to carry out operations comprising:

making a determination (i) that the first base station has detected threshold air interface interference from a second base station and (ii) that a physical random access channel (PRACH) on an air interface provided by the first base station overlaps in time and frequency with a physical uplink shared channel (PUSCH) on an air interface provided by the second base station, and responsive to the determination, outputting for transmission to the second base station a directive for causing the second base station to reduce transmission in resources of the PUSCH that are coincident in time and frequency with the PRACH of the first base station, wherein reducing PUSCH transmission in PUSCH resources comprises reducing coding rate for transmission in the PUSCH resources.

18. The non-transitory computer-readable medium of claim 17, wherein reducing transmission in the resources of the PUSCH that are coincident in time and frequency with the PRACH of the first base station comprises:

identifying the resources that are coincident in time and frequency with the PRACH of the first base station; and reducing coding rate for transmission in the identified resources.

19. The non-transitory computer-readable medium of claim 17, wherein reducing coding rate for transmission in the PUSCH resources comprises specifying in a scheduling directive for the PUSCH resources a lower order codec than would normally be dictated by reported channel quality.

* * * * *